United States Patent
Castinado et al.

(10) Patent No.: US 11,121,989 B1
(45) Date of Patent: Sep. 14, 2021

(54) CENTRALIZED REPOSITORY AND COMMUNICATION SYSTEM FOR CROSS-NETWORK INTERACTIONS

(71) Applicant: BANK OF AMERICA CORPORATION, Charlotte, NC (US)

(72) Inventors: Joseph Benjamin Castinado, North Glenn, CO (US); Sandeep Kumar Chauhan, Hyderabad (IN); Charles Russell Kendall, Snoqualmie, WA (US); Yash Sharma, Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/887,181

(22) Filed: May 29, 2020

(51) Int. Cl.
| | |
|---|---|
| *G06F 15/16* | (2006.01) |
| *H04L 12/58* | (2006.01) |
| *H04L 29/08* | (2006.01) |
| *H04L 9/32* | (2006.01) |
| *H04L 29/06* | (2006.01) |

(52) U.S. Cl.
CPC ............ *H04L 51/04* (2013.01); *H04L 9/3239* (2013.01); *H04L 67/18* (2013.01); *H04L 67/42* (2013.01); *H04L 2209/38* (2013.01)

(58) Field of Classification Search
CPC ....... H04L 51/04; H04L 9/3239; H04L 67/18; H04L 67/42; H04L 2209/38
See application file for complete search history.

(56) References Cited

U.S. PATENT DOCUMENTS

| | | | |
|---|---|---|---|
| 5,650,604 A | 7/1997 | Marcous et al. | |
| 5,920,847 A | 7/1999 | Kolling et al. | |
| 6,199,051 B1 | 3/2001 | Gifford | |
| 6,339,766 B1 | 1/2002 | Gephart | |
| 6,736,314 B2 | 5/2004 | Cooper et al. | |
| 6,996,605 B2 * | 2/2006 | Low ...................... | G06Q 30/06 709/203 |
| 7,711,638 B2 | 5/2010 | Michelsen et al. | |
| 7,729,986 B1 | 6/2010 | Hoffman et al. | |
| 7,797,233 B2 | 9/2010 | Sobek | |
| 8,041,606 B2 | 10/2011 | Mascavage, III et al. | |
| 8,055,582 B2 | 11/2011 | Digrigoli et al. | |
| 8,175,961 B2 | 5/2012 | Reid et al. | |
| 8,255,327 B2 | 8/2012 | Kemper et al. | |

(Continued)

*Primary Examiner* — Razu A Miah
(74) *Attorney, Agent, or Firm* — Michael A. Springs; Moore & Van Allen PLLC; Jeffrey R. Gray

(57) ABSTRACT

A cross-network interaction network for allowing cross-network real-time validation and interactions. The cross-network interaction network is set-up as a central location for managing interactions with resource exchanges between different real-time interaction networks. The real-time interaction networks are separate self-contained networks located within an area (e.g., country, or the like) or between different areas (e.g., different countries, or the like). Each self-contained real-time interaction network may have different systems, applications, processes, or the like that prevents the real-time interaction networks from allowing interactions outside of the real-time interaction networks. Consequently, the cross-network interaction network may set-up and utilize a messaging system, a clearing system, and/or a repository system to facilitate the interactions across the different real-time interaction networks.

19 Claims, 4 Drawing Sheets

(56) References Cited

U.S. PATENT DOCUMENTS

| | | | |
|---|---|---|---|
| 8,271,382 B2 | 9/2012 | Seifert et al. | |
| 8,370,259 B2 | 2/2013 | Templeton et al. | |
| 8,473,593 B1* | 6/2013 | Graham | H04L 41/0233 |
| | | | 709/223 |
| RE44,502 E | 9/2013 | Boesch et al. | |
| 8,566,237 B2 | 10/2013 | Forzley | |
| 8,571,980 B1 | 10/2013 | Greenwood | |
| 8,626,653 B1 | 1/2014 | Krikorian et al. | |
| 8,639,621 B1 | 1/2014 | Ellis et al. | |
| 8,781,960 B2 | 7/2014 | Marshall | |
| 8,838,795 B2* | 9/2014 | Friedman | H04L 12/1822 |
| | | | 709/226 |
| 8,849,977 B2* | 9/2014 | Kristiansson | H04L 67/1051 |
| | | | 709/223 |
| 8,851,366 B2 | 10/2014 | Modi | |
| 8,924,294 B2 | 12/2014 | Lynch et al. | |
| 9,530,125 B2 | 12/2016 | Bacastow | |
| 10,311,431 B2 | 6/2019 | Henry | |
| 10,558,960 B2 | 2/2020 | Tulluri et al. | |
| 10,565,574 B2 | 2/2020 | Powell | |
| 10,740,843 B2 | 8/2020 | Shakkarwar | |
| 2001/0034703 A1 | 10/2001 | Picciallo et al. | |
| 2001/0042785 A1 | 11/2001 | Walker et al. | |
| 2002/0077978 A1 | 6/2002 | OLeary et al. | |
| 2002/0087467 A1 | 7/2002 | Mascavage et al. | |
| 2002/0152160 A1 | 10/2002 | Allen-Rouman et al. | |
| 2002/0156911 A1* | 10/2002 | Croman | H04L 41/5077 |
| | | | 709/235 |
| 2002/0198826 A1 | 12/2002 | Wasserman et al. | |
| 2003/0022655 A1 | 1/2003 | Bogat | |
| 2003/0046229 A1 | 3/2003 | Cresswell | |
| 2003/0061170 A1 | 3/2003 | Uzo | |
| 2003/0093373 A1 | 5/2003 | Smirnoff et al. | |
| 2003/0144935 A1 | 7/2003 | Sobek | |
| 2003/0187789 A1 | 10/2003 | Karas et al. | |
| 2003/0229718 A1* | 12/2003 | Tock | H04L 63/168 |
| | | | 709/246 |
| 2003/0233317 A1 | 12/2003 | Judd | |
| 2004/0024700 A1 | 2/2004 | Petigny | |
| 2004/0024701 A1 | 2/2004 | Hansen et al. | |
| 2004/0030645 A1 | 2/2004 | Monaghan | |
| 2004/0093303 A1 | 5/2004 | Picciallo | |
| 2004/0143552 A1 | 7/2004 | Weichert et al. | |
| 2004/0215963 A1 | 10/2004 | Kaplan | |
| 2004/0230527 A1 | 11/2004 | Hansen et al. | |
| 2004/0243503 A1 | 12/2004 | Eng et al. | |
| 2005/0017067 A1 | 1/2005 | Seifert et al. | |
| 2005/0033653 A1 | 2/2005 | Eisenberg et al. | |
| 2005/0080728 A1 | 4/2005 | Sobek | |
| 2005/0119969 A1 | 6/2005 | Michelsen et al. | |
| 2005/0131816 A1 | 6/2005 | Britto et al. | |
| 2005/0187867 A1 | 8/2005 | Sokolic et al. | |
| 2005/0209958 A1 | 9/2005 | Michelsen et al. | |
| 2006/0022032 A1 | 2/2006 | Fillinger et al. | |
| 2006/0124729 A1 | 6/2006 | Martin | |
| 2006/0218627 A1 | 9/2006 | Komatsu | |
| 2007/0118585 A1* | 5/2007 | Inoue | H04W 4/029 |
| | | | 709/200 |
| 2007/0168450 A1* | 7/2007 | Prajapat | H04L 51/04 |
| | | | 709/207 |
| 2007/0175984 A1 | 8/2007 | Khandaker et al. | |
| 2008/0120218 A1 | 5/2008 | Reid et al. | |
| 2008/0210751 A1 | 9/2008 | Kim | |
| 2008/0301047 A1 | 12/2008 | Fish et al. | |
| 2009/0178120 A1 | 7/2009 | Royyuru et al. | |
| 2009/0222897 A1 | 9/2009 | Carow et al. | |
| 2009/0234950 A1* | 9/2009 | Wikman | H04L 29/12113 |
| | | | 709/225 |
| 2010/0014528 A1* | 1/2010 | Amir | H04L 45/38 |
| | | | 370/400 |
| 2010/0161486 A1 | 6/2010 | Liu et al. | |
| 2010/0205095 A1 | 8/2010 | Ostrovsky | |
| 2011/0029396 A1 | 2/2011 | Sobek | |
| 2011/0055077 A1 | 3/2011 | French et al. | |
| 2011/0145020 A1 | 6/2011 | Gaset | |
| 2012/0179610 A1 | 7/2012 | Allen-Rouman et al. | |
| 2012/0209762 A1* | 8/2012 | Metaireau | G06Q 20/3223 |
| | | | 705/39 |
| 2012/0246341 A1* | 9/2012 | Merk | H04L 67/1065 |
| | | | 709/245 |
| 2012/0303525 A1 | 11/2012 | Sahadevan | |
| 2013/0185186 A1 | 7/2013 | Blackwood | |
| 2013/0191446 A1* | 7/2013 | Ro | G06F 9/5044 |
| | | | 709/203 |
| 2013/0246262 A1 | 9/2013 | Battaglini et al. | |
| 2013/0311663 A1* | 11/2013 | Kamath | H04L 67/14 |
| | | | 709/227 |
| 2014/0095633 A1* | 4/2014 | Yoakum | H04L 51/043 |
| | | | 709/206 |
| 2014/0280794 A1* | 9/2014 | Baca | H04W 4/33 |
| | | | 709/220 |
| 2015/0096011 A1* | 4/2015 | Watt | H04L 63/0272 |
| | | | 726/15 |
| 2015/0149478 A1* | 5/2015 | Krishna | G06F 16/41 |
| | | | 707/741 |
| 2015/0281918 A1* | 10/2015 | Anantharaju | H04L 51/04 |
| | | | 709/206 |
| 2015/0334181 A1* | 11/2015 | Jimenez | H04L 67/1046 |
| | | | 709/204 |
| 2015/0381470 A1* | 12/2015 | Ma | H04L 67/42 |
| | | | 709/203 |
| 2016/0132884 A1 | 5/2016 | Fridman et al. | |
| 2017/0323298 A1 | 11/2017 | Licciardello et al. | |
| 2018/0075452 A1 | 3/2018 | Weller et al. | |
| 2018/0241689 A1* | 8/2018 | Xu | H04L 61/2061 |

\* cited by examiner

CENTRALIZED REPOSITORY AND COMMUNICATION SYSTEM FOR CROSS-NETWORK INTERACTIONS

FIELD

The present disclosure relates to utilizing a cross-network interaction system for cross-network interactions, and more particularly, for aiding entities in joining real-time interaction networks and exchanging resources between different real-time interaction networks through the use of a centralized repository, communication, and clearing system.

BACKGROUND

A real-time interaction network is a self-contained system that requires the entities to belong to the network and be verified by the network in order to allow for interactions between the entities. Moreover, any interactions that occur within the real-time network are limited to the real-time network. Consequently, entities cannot interact with other entities if they are not located on the same real-time interaction network.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for a cross-network interaction network for allowing cross-network real-time validation and interactions. The cross-network interaction network is set-up as a central location for managing interactions with resource exchanges between different real-time interaction networks. The real-time interaction networks, as described herein, are separate self-contained networks located within an area (e.g., country, or the like) or between different areas (e.g., different countries, or the like). Regardless of where each real-time interaction network is located, each self-contained real-time interaction network may have different systems, applications, processes, or the like that prevents the real-time interaction network from allowing interactions outside of the real-time interaction network. Consequently, the cross-network interaction network may comprise setting up and utilizing a messaging system, a clearing system, and/or a repository system to facilitate interactions across real-time interaction networks.

The messaging system allows the cross-network interaction network to build out a system of real-time interaction networks to allow entities to search for different real-time interaction networks to which the entities may want to belong (e.g., request registration on different real-time interaction networks), search for other entities on other real-time interaction networks (e.g., search other real-time interaction networks to send or receive resources to or from other entities on other real-time interaction networks), and/or to provide or receive notification from other real-time interaction networks (e.g., when requesting or completing interactions that include the transfer of resources).

The clearing system in some embodiments may hold resources pools for each of the real-time interaction networks that belong to the cross-network interaction network. In some embodiments, the resource pools may be actual resource pools for which the real-time interaction networks may send and receive resources for the interactions across real-time networks. Alternatively, or additionally, the resource pools may be virtual resources pools that are used for settlement purposes (e.g., tracking the resources that each real-time interaction network has) and the actual resources may be held in a centralized resource pool of the cross-network interaction network.

The repository system, and in particular the aliases therein, is utilized in order to determine from which distributing entity the resources are being received from and to which receiving entity the resources are going to be distributed. That is, the aliases are validated to one or more real-time interaction networks and/or one or more resource pools therein. As such, the aliases are utilized to receive the resources from the distributing real-time interaction network and transfer them to the receiving real-time interaction network. The use of aliases, in some embodiments, prevents the cross-network interaction network from having access to actual resource pool numbers. That is, the real-time interaction network to which the entity belongs is the only entity that has the resource pools numbers of the entity.

Embodiments of the invention comprise systems, computer implemented methods, and computer program products for using a cross-network interaction system for exchanging resources between real-time interaction networks. The invention includes receiving interaction information from an entity regarding an interaction, wherein the interaction comprises an exchange of resources from a distributing entity to a receiving entity for the interaction. The entity from which the interaction information is received may be the receiving entity or the distributing entity. The distributing entity belongs to a first real-time interaction network and the receiving entity belongs to a second real-time interaction network. Resources are transferred from a first resource pool of the first real-time interaction network to a second resource pool of the second real-time interaction network. The interaction is settled between the first real-time interaction network and the second real-time interaction network. The resources are exchanged and the interaction is settled using a receiving entity alias of the receiving entity and a distributing entity alias of the distributing entity In further accord with the invention, the receiving entity selects the second real-time interaction network to receive the resources from a plurality of real-time interaction networks for which the second entity belongs.

In other embodiments of the invention, the distributing entity selects the first real-time interaction network from which to send the resources from a plurality of real-time interaction networks for which the distributing entity belongs.

In yet other embodiments of the invention, the first real-time interaction network is in a first country and the second real-time interaction network is in a second country.

In still other embodiments of the invention, the first real-time interaction network has a first repository system, a first clearing system, and a first messaging system, and wherein the second real-time interaction network has a second repository system, a second clearing system, and a second messaging system, and wherein the system has one or more application processing interfaces (APIs) to communicate with the first repository system, the first clearing system, the first messaging system, the second repository system, the second clearing system, and the second messaging system In other embodiments, the invention further comprises one or more cross-network clearing systems to hold the resources for a plurality of real-time interaction networks In further accord with embodiments of the invention, the first resource pool holds first resources for the first real-time interaction network and the second resource pool holds second resources for the second real-time interaction network within the one or more cross-network clearing systems, and wherein the system facilitates the exchange of the resources between the first resource pool and the second resource pool.

In other embodiments of the invention, the first resource pool is a first virtual resource pool and the second resource pool is a second virtual resource pool, and the resources are held within a clearing resource pool within the one or more cross-network clearing systems.

In still other embodiments, the invention further comprises a cross-network repository system for storing a plurality of entities, a plurality of real-time interaction networks on which the plurality of entities are members, and a plurality of aliases for the plurality entities.

In yet other embodiments of the invention, the entity of the plurality of entities utilizes different aliases for at least two of the plurality of real-time interaction networks on which the entity belongs.

In other embodiments of the invention, the entity on a real-time interaction network searches the cross-network repository system to identify an opposing entity on a different real-time interaction network.

In further accord with embodiments, the invention further comprising a cross-network messaging system for allowing messages for interactions between a plurality of real-time interaction networks.

In other embodiments of the invention, the one or more processing devices are further configured to execute the computer-readable program code to receive a request from the entity to become a member of an additional real-time interaction network. One or more real-time interaction networks are identified from the plurality of real-time interaction networks to which the entity belongs. Entity information of the entity is provided from the one or more real-time interaction networks to the additional real-time interaction network for which the user wants to belong for verification of the entity. A notification is received from the additional real-time interaction network that the entity has been added to the additional real-time interaction network.

In still other embodiments of the invention, the entity information comprises one or more aliases of the entity for the one or more real-time interaction networks to which the entity belongs.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
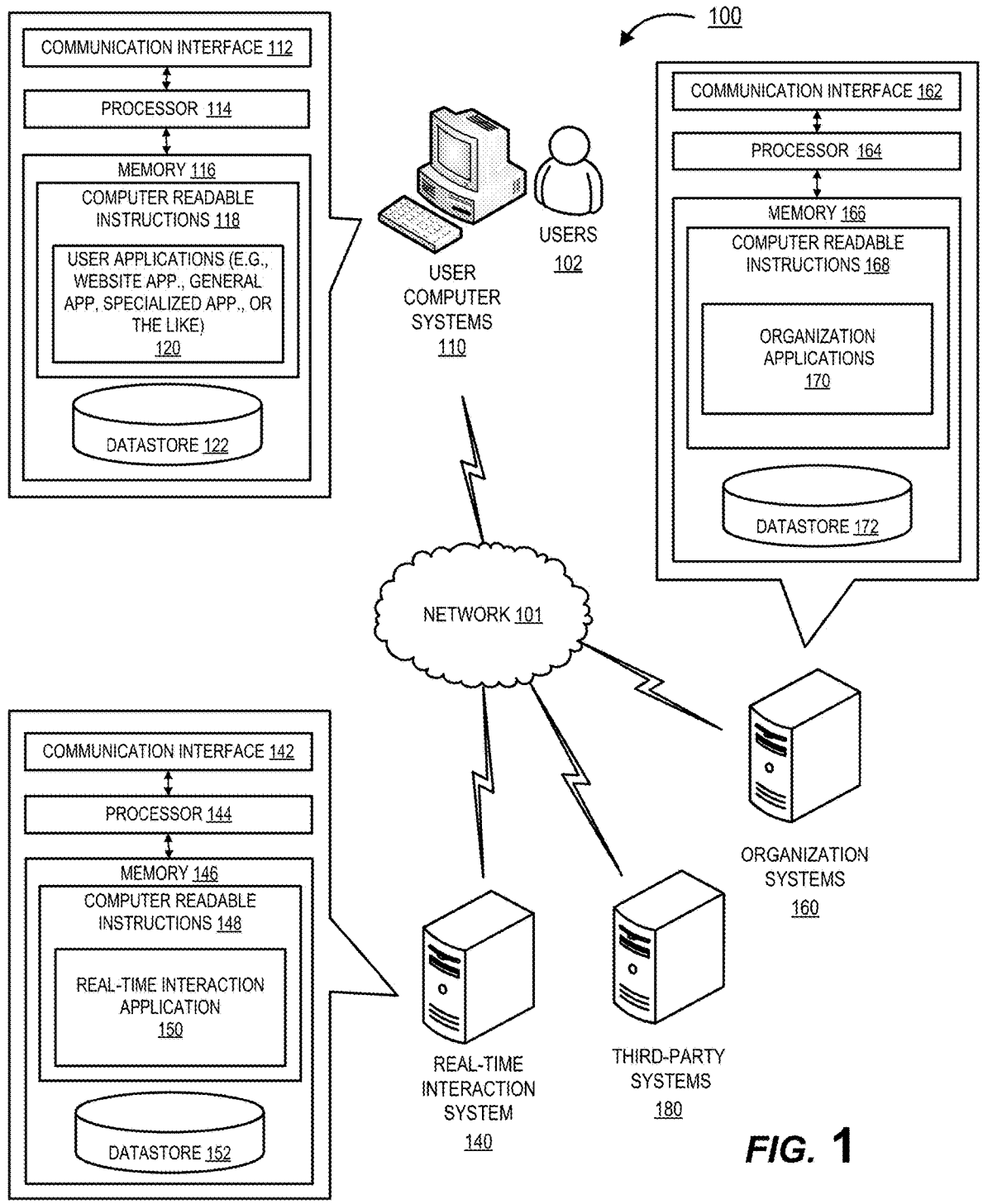

Having thus described embodiments of the invention in general terms, reference will now be made to the accompanying drawings, wherein:

FIG. 1 provides a real-time interaction system environment, in accordance with some embodiments of the present disclosure.

Figure 2:
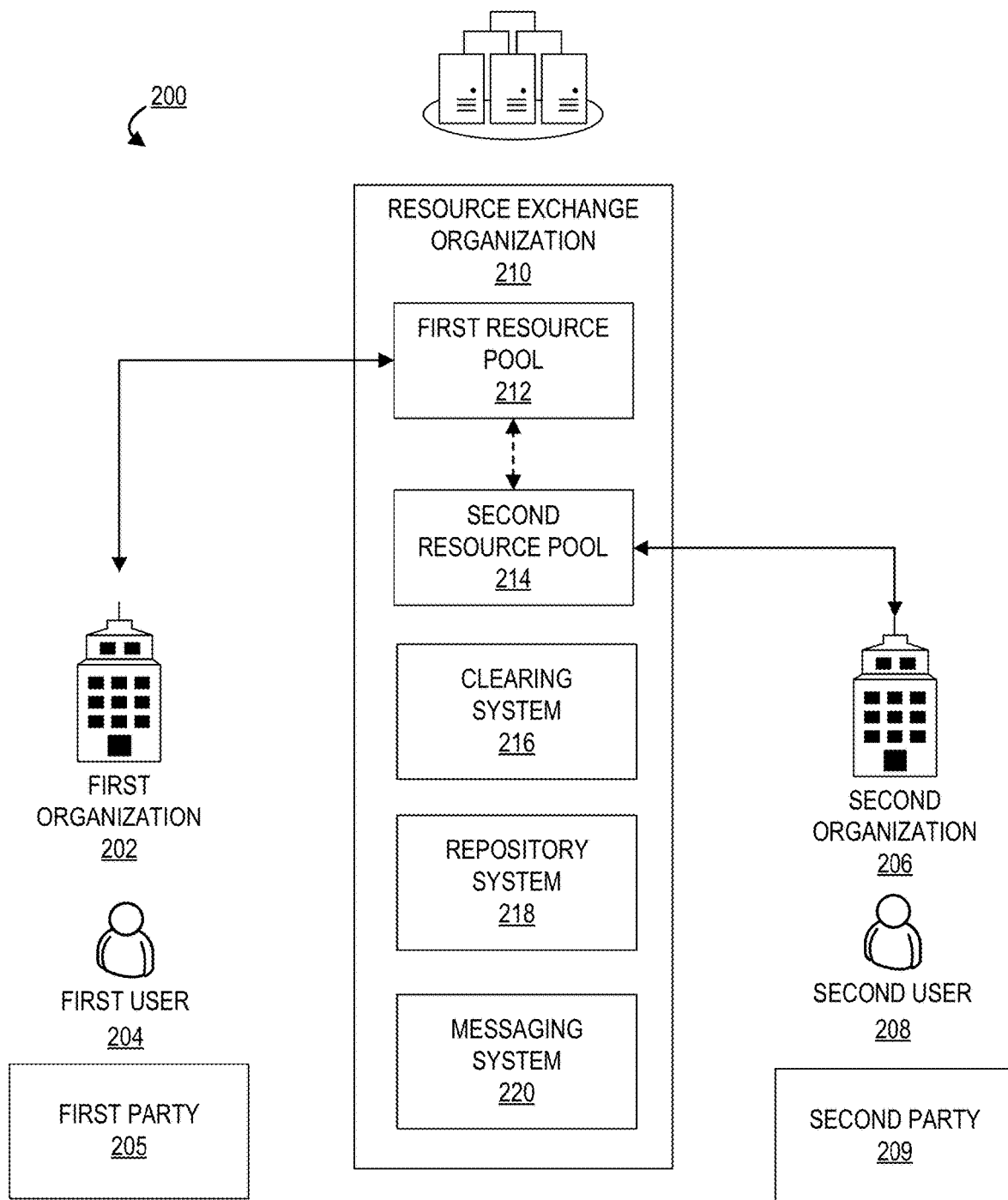

FIG. 2 provides a block diagram of a real-time interaction flow, in accordance with some embodiments of the present disclosure.

Figure 3:
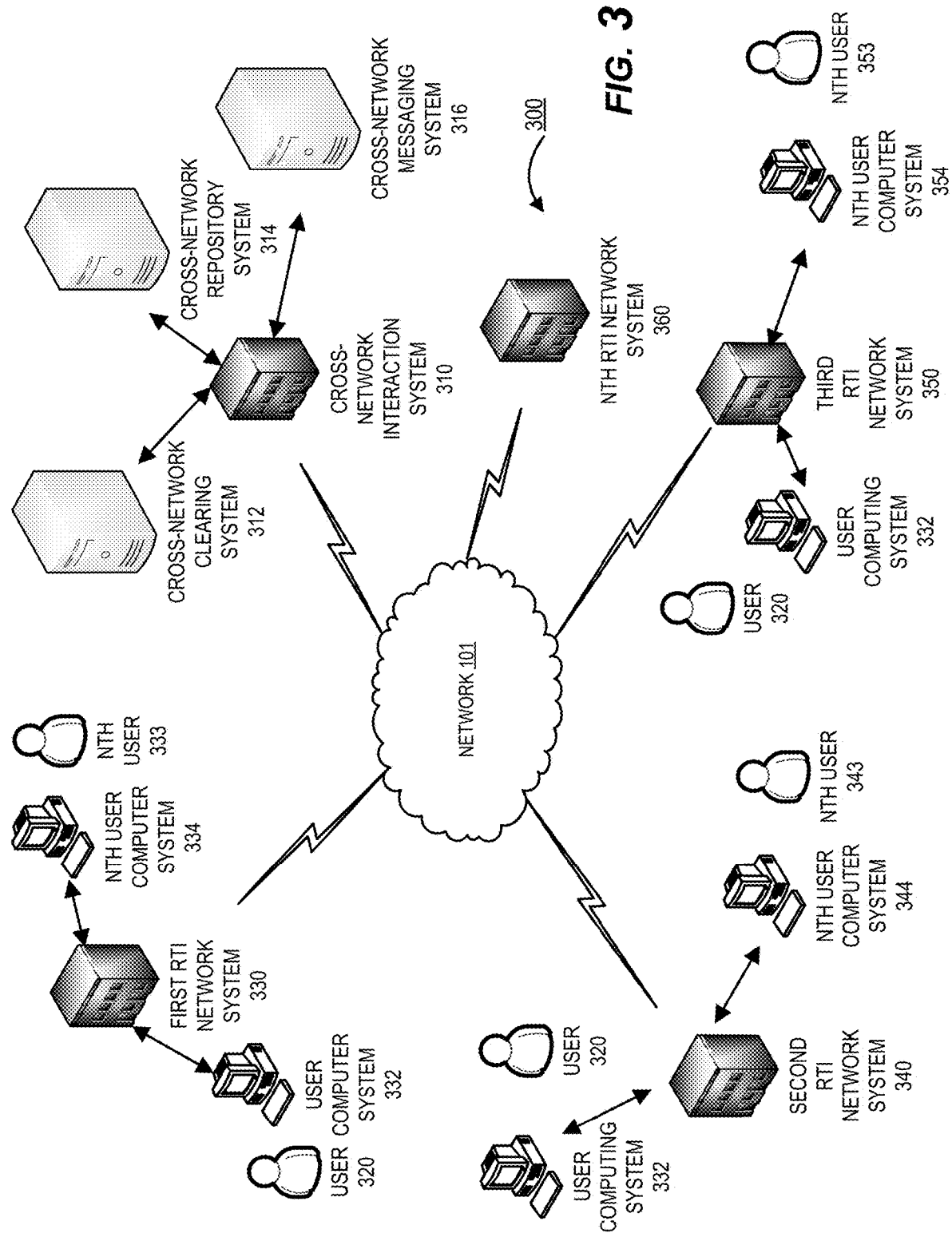

FIG. 3 provides a cross-network interaction system for providing cross-network validation and interactions, in accordance with some embodiments of the present disclosure.

Figure 4:
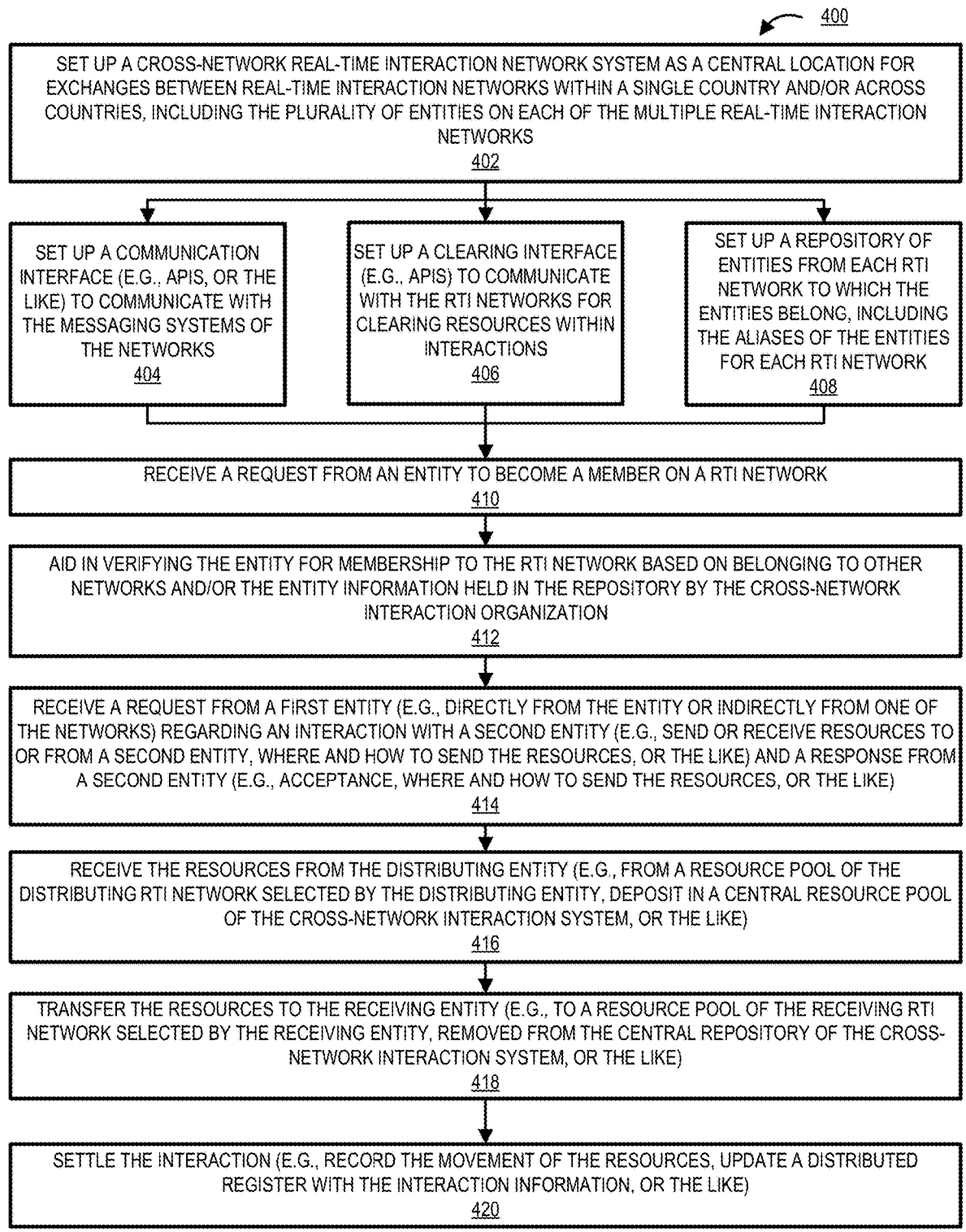

FIG. 4 provides a process flow for set-up of a cross-network interaction system, aiding in the validation of entities across real-time interaction networks, and for aiding in the interactions across real-time interaction networks, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

FIG. 1 provides a system that includes specialized systems and devices communicably linked across a network to perform the functions of implementing the real-time interaction processing system as described herein. FIG. 1 provides a real-time interaction processing system environment 100, in accordance with some embodiments of the present disclosure. As illustrated in FIG. 1, the real-time interaction system 140 (e.g., operated by one or more of the organizations, such as the resource exchange organization 210) is operatively coupled, via a network 101 to the user computer systems 110, the one or more organization systems 160, and/or the one or more third-party systems 180. In this way, the real-time interaction system 140 can send information to, and receive information from, the user computer systems 110, the organization systems 160, and/or the third-party systems 180. FIG. 1 illustrates only one example of some embodiments of the real-time interaction system environment 100, and it will be appreciated that in other embodiments one or more of the systems, devices, or servers may be combined into a single system, device, or server, or be made up of multiple systems, devices, or servers.

In accordance with embodiments of the invention, the term "entity" may be used instead of "user," "party" (e.g., third party), or "organization." As such, it should be understood that while the embodiments described herein discuss interactions between users, third-parties, and/or each other, it should be understood that the interactions may be described as occurring between entities (e.g., a first entity, second entity, or the like). Consequently, the term "entity" may include any user 102 acting on his/her own behalf, any party (e.g., business, company, third-party or the like) acting on its own behalf, or any user 102 acting on behalf of any party. An "organization" may refer to a business, company, or the like that maintains or operates the system or a portion thereof, including allowing for the exchange of resources between the various entities described herein.

The network 101 may be a system specific network receiving and distributing specific network feeds and identifying specific network associated triggers. The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the entity (e.g., a user 102) utilizes an entity computer system 110 (e.g., a user computer system 110) to implement the real-time interaction processing system over the network 101, such as by initiating, implementing, settling, and/or monitoring an interaction that involves a resource exchange. In some embodiments the entity (e.g., a user 102, party, or the like) is completing an interaction leveraging a real-time interaction system 140 with another entity (e.g., another user 102, another party, or the like). As such the entity (e.g., a user 102) may be a distributing entity that is distributing resources to a receiving entity. Alternatively, the entity (e.g., a user 102) may be a receiving entity that is receiving resources from a distributing entity. The interaction may be initiated (e.g., sending an interaction request) by the receiving entity or the distributing entity.

In some embodiments, the user 102 has a user computer system 110, such as a mobile device (e.g., a mobile phone, smart phone, tablet, or the like) that may interact with a user computer system 110 of another user 102 and/or the systems and devices described herein to allow for an interaction, in which resources are exchanged. In some embodiments, the user 102 may be a computing device user, a phone user, a mobile device application user, a customer (e.g., a resource pool holder or a person who has a resource pool, or the like), a system operator, database manager, a support technician, and/or employee of an entity. In some embodiments, aliases may be utilized to facilitate the interactions between entities, such that the entities do not have access to resource pool information of the other entities, as will be discussed in further detail herein. The aliases of a user 102 may include online handles, usernames, identification numbers (e.g., Internet protocol (IP) addresses), e-mails, phone number, family names, maiden names, nicknames, or the like.

As used herein, the term "user computer system" may refer to any device that employs a processor and memory and can perform computing functions, such as a personal computer or a mobile device, wherein a mobile device is any mobile communication device, such as a cellular telecommunications device (e.g., a cell phone or mobile phone), personal digital assistant (PDA), a mobile Internet accessing device, smartphone, or other mobile device. Other types of mobile devices may include pagers, wearable devices, mobile televisions, gaming devices, laptop computers, cameras, video recorders, audio/video player, radio, global positioning system (GPS) devices, or any combination of the aforementioned. In some embodiments, a user computer system 110 may refer to any computer system, platform, server, database, networked device, or the like. The user computer system 110 may be used by the user 102 to access another system directly or through an application, online portal, internet browser, virtual private network, or other connection channel. The user computer system 110 may be a computer system within a network of connected computer system that share one or more network storage locations.

It is understood that the servers, systems, and devices described herein illustrate some embodiments of the present disclosure. It is further understood that one or more of the servers, systems, and devices can be combined in other embodiments and still function in the same or similar way as the embodiments described herein.

As illustrated in FIG. 1, the user computer system 110 may generally include a processing device or processor 114 communicably coupled to devices such as, a memory device 116, a communication device 112 (e.g., user output devices, such as, a user display device, or a speaker, or the like, user input devices, such as, a microphone, keypad, touchpad, touch screen, and the like), a power source, a clock or other timer, an image capture device (e.g., a camera, video recorder, or the like), a positioning system device, such as a geo-positioning system device like a GPS device or the like and the like. The processing device 114 may further include a central processing unit, input/output (I/O) port controllers, a graphics controller or GPU, a serial bus controller and a memory and local bus controller.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processor 114 may include functionality to operate one or more software programs or applications, which may be stored in the memory 116. For example, the processor 114 may be capable of operating applications such as the user application 120. The user application 120 may be configured to allow the user computer system 110 to transmit and receive data and instructions from the other devices and systems. The user computer system 110 comprises computer-readable instructions 118 and data storage 122 stored in the memory device 116, which in some embodiments include the computer-readable instructions 118 of a user application 120. In some embodiments, the user application 120 allows a user 102 to access and/or interact with other users 102 (e.g., entities with other entities, or the like). In some embodiments, the user application 120 further includes features for accessing a real-time interaction system 140 for entering and completing real-time interactions.

The processor 114 may be configured to use the communication interface 112 to communicate with one or more other systems on a network 101 such as, but not limited to other user systems 120, the real-time interaction system 140, the organization systems 160, and/or the third-party systems 180. In this regard, the communication interface 112 may include an antenna operatively coupled to a transmitter and a receiver (together a "transceiver"), modem. The processor 114 may be configured to provide signals to and receive signals from the transmitter and receiver, respectively. The signals may include signaling information in accordance with the air interface standard of the applicable BLE standard, cellular system of the wireless telephone network and the like, that may be part of the network 101. In this regard, the user computer system 110 may be configured to operate with one or more air interface standards, communication protocols, modulation types, and access types. By way of illustration, the user computer system 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) or fifth-generation (5G) wireless communication protocols, and/or the like. The user computer system 110 may also be configured to operate in accordance with non-cellular communication mechanisms, such as via a wireless local area network (WLAN) or other communication/data networks. The user computer system 110 may also be configured to operate in accordance Bluetooth® low energy, audio frequency, ultrasound frequency, or other communication/data networks.

The user computer system 110 may also include a memory buffer, cache memory or temporary memory device operatively coupled to the processor 114. Typically, one or more applications 120 are to store data, code, or other information. The memory 116 may include volatile memory loaded into the temporary memory during use. As used herein, memory 116 may include any computer readable medium configured memory, such as volatile Random-Access Memory (RAM) including a cache area for the temporary storage of data. The memory 116 may also include non-volatile memory, which can be embedded and/or may be removable. The non-volatile memory may additionally or alternatively include an electrically erasable programmable read-only memory (EEPROM), flash memory or the like.

FIG. 1 further provides a block diagram of the real-time interaction system 140, in accordance with embodiments of the invention. The real-time interaction system 140 generally comprises a communication interface 142, a processor 144, and a memory 146. The processor 144 is operatively coupled to the communication interface 142 and the memory 146. The processor 144 uses the communication interface 142 to communicate with the network 101 and other devices on the network 101, such as, but not limited to the user computer systems 110, the organization systems 160, and/or the third-party systems 180. As such, the communication interface 142 generally comprises a modem, server, transceiver, or other device for communicating with other devices on the network 101.

The real-time interaction system 140 comprises computer-readable instructions 148 stored in the memory 146, which in some embodiments include the computer-readable instructions 148 of a real-time interaction application 150. In some embodiments, the memory 146 includes data storage 152 for storing data related to the system environment, but not limited to data created and/or used by the real-time interaction application 150. In some embodiments, the datastore or data storage 152 of the real-time interaction system may store a record of one or more interactions (e.g., transactions). The real-time interaction systems 140 may include and/or interact with a clearing system (e.g., internal or external clearing system to clearing resources transfers in associating with interactions), a repository system (e.g., for storing and managing the entities and entity aliases on the real-time interaction network), and/or messaging systems (e.g., for facilitating communications between entities on real-time interaction system).

Embodiments of the real-time interaction system 140 may include multiple systems, servers, computers or the like maintained by one or many organizations. FIG. 1 merely illustrates one of those systems that, typically, interacts with many other similar systems, such as the user devices 110, the organization systems 160, and/or third-party systems 180, to complete and settle interactions over real-time resource exchange networks. In some embodiments, the real-time interaction system 140 may be part of an organization system 160, third-party system 180, or vice versa. The real-time interaction system 140 may communicate with the user computer systems 110, organization systems 160, and/or third-party systems 180 via a secure connection generated for secure encrypted communications between the systems.

In some embodiments of the real-time interaction system 140, the memory 146 stores a real-time interaction application 150. In some embodiments of the present disclosure, the real-time interaction application 150 may associate with applications having computer-executable program code that instructs the processor 144 to operate the network communication interface 142 to perform certain communication functions described herein. In some embodiments, the computer-executable program code of an application associated with the real-time interaction application 150 may also instruct the processor 144 to perform certain logic, data processing, and data storing functions of the application.

The processor 144 is configured to use the communication interface 142 to gather data, such as data corresponding to interactions from various data sources such as the user devices 110, organization systems 160, and/or third-party systems 180. The processor 144 stores the data that it receives in the memory 146. The memory 146 may further comprise stored user account information (e.g., account number, routing number, user identifying information, etc.).

FIG. 1 further provides a block diagram of one or more organization systems 160, in accordance with embodiments of the invention. In some embodiments, the organization systems 160 may refer to the systems of organizations that hold resources for the entities, such as users 102 and/or for other parties, facilitates interactions between the entities. The organization systems 160 generally comprise a communication interface 162, a processor 164, and a memory 166. The processor 164 is operatively coupled to the communication interface 162 and the memory 166. The processor 164 uses the communication interface 162 to communicate with the network 101 and other devices on the network 101, such as, but not limited to the user devices 110, the real-time interaction systems 140, and/or the third-party systems 180. As such, the communication interface 162 generally comprises a modem, server, transceiver, or other device for communicating with other devices on the network 101.

The organization systems 160 further comprise computer-readable instructions 168 stored in the memory 166, which in some embodiments include the computer-readable instructions 168 of an organization application 170. In some embodiments, the memory device 166 includes data storage 172 for storing data related to the system environment 100, but not limited to data created and/or used by the organization systems 160, the user computer systems 110, the real-time interaction systems 140, and/or the third-party systems 180.

Embodiments of the organization systems 160 may include multiple systems, servers, computers or the like maintained by one or many organizations. In some embodiments, the real-time interaction systems 140 may or may not be distinct from the organization systems 160. The organization systems 160 may communicate with the real-time interaction systems 140 via secure connections generated for secure encrypted communications between the systems.

In some embodiments of the organization systems 160, the memory 166 stores an organization application 170. In some embodiments, the memory 166 stores data including, but not limited to, at least portions of interaction records comprising a record of one or more real-time interactions. In some embodiment of the disclosure, the organization application 170 may associate with applications having computer-executable program code that instructs the processor 164 to operate the network interface 162 to perform certain communication functions described herein. In some embodiments, the computer-executable program code of an application 170 may also instruct the processor 164 to perform certain logic, data processing, and data storing functions of the application.

The processor 164 is configured to use the communication interface 162 to gather information, such as interaction information corresponding to interactions in order to process interactions. In some embodiments, the processor 164 may be configured to identify electronic instruments associated with resource exchanges and use the electronic documents to enter into the real-time interactions, complete the real-time interactions, and/or monitor the real-time interactions, and store the forgoing (e.g., in data store 172, or the like). The organization systems 160 may maintain a detailed record of a series of interactions that are updated in real-time based the real-time interactions taking place. In this way, the organization systems 160 (e.g., individual organizations, resource exchange organization, or the like) process interactions in real-time instead of relying on traditional end-of-period, batch-processing clearing and settlement methods.

The one or more third party systems 180 may comprise the systems that a third party (e.g., a product provider) uses to enter into interactions with users 102. For example, the third-party may be a merchant that provides a product (e.g., goods or services) to a user 102 during an interaction, and collects resources from the user 102 (e.g., or an entity or organization of the user 102) through the one or more organization systems 160. It should be understood that both the user 102 and the product provider party may have resource pools with the real-time interaction systems 140, such as through one or more organizations, in order to allow for resource transfers associated with the interaction.

As such, it should be understood, and as will be described herein in further detail, the interaction may occur between two users 102 using the user computer systems 110 on behalf of themselves, between a user 102 and a third-party (directly with a third-party or with another user operating on behalf of the third-party), and/or between two parties (directly with each other). As previously described herein the users 102 and/or parties may be described herein as entities.

As used herein, a "real-time interaction (RTI)" refers to a resource exchange (or transfer) between entities (e.g., users, third-parties, or the like) participating in and leveraging a settlement network operating in real-time (e.g., twenty-four hours a day and seven days a week, or the like), wherein settlement of the interaction occurs at or very close in time to the time of the interaction (e.g., real-time). A real-time interaction may include a resource exchange, wherein a real-time interaction system enables participants to initiate credit transfers, receive settlement for credit transfers, and makes available to a receiving entity resources (e.g., funds, or the like) associated with the credit transfers in real-time, wherein the credit transfer may be final and irrevocable. Real-time interactions and resource exchanges provide marked improvements over conventional interaction clearing and transfer settlement methods (e.g., automated clearing house (ACH), wire, or the like) which can require several hours, days, or longer to receive, process, and authenticate an interaction and resource exchange (e.g., clearing), and make funds available to the receiving entity which may, in total, require several back-and-forth communications between the organizations (e.g., financial institutions) involved. In some cases, conventional settlement methods may not be executed until the end of the business day (EOB), wherein resource exchanges are settled in batches between organizations.

Real-time interactions reduce settlement time by providing pre-authentication or authentication at the time of a requested interaction in order to enable instantaneous or near-instantaneous (e.g., collectively, real-time) resource exchange and settlement between organizations at the time of the interaction, wherein resources may be made immediately available to a receiving entity (e.g., payee) following completion of the interaction, such as from a distributing entity (e.g., payor). Examples of real-time interactions include business to business interactions (e.g., supplier exchanges), business to consumer interactions (e.g., legal settlements, insurance claims, employee wages), consumer to business interactions (e.g., bill pay, hospital co-pay, payment at point-of-sale), and peer to peer (P2P) interactions (e.g., repayment or remittance between friends and family). In a specific example, a real-time interaction may be used for payment of a utility bill on the due date of the bill to ensure payment is received on-time and accruement of additional funds due to late payment is avoided. In some embodiments, a negotiable instrument (e.g., check, or the like) may be used to exchange resources; however, a real-time interaction may be used to make the resource exchange using the negotiable instrument. In another example, real-time interactions may be especially beneficial for small entities and users (e.g., small merchants/businesses) that may have a heavier reliance on short-term resources and may not prefer to wait days for resource settlements.

Real-time interactions not only provide settlement immediacy, but also provide assurance, misappropriation reduction, and bank-grade security to resource exchanges due to the inherent nature of the resource exchange and user authentication infrastructure. Further, real-time interactions may reduce payment processing costs due to the simplified nature of required communication when compared to conventional settlement methods. In some embodiments, real-time interaction systems further include information and conversation tools that financial institutions may utilize to enhance a settlement experience for the entities.

A system leveraging a real-time interaction network for resource exchanges allows for an interaction with a resource exchange to be completed between participating entities via a clearing system (e.g., internal or intermediary clearing system). Organization resource pools (e.g., financial institution resource pools) are held at the resource exchange organization (e.g., clearing institution, or the like) and administered by the organization and/or the resource exchange organization. In this way, the resource exchange organization is able to exchange resources between organization resource pools on behalf of the organizations in order to settle interactions between entities affiliated with the organizations (e.g., customers of the organizations). A real-time interaction network flow is discussed in further detail with respect to FIG. 2.

FIG. 2 illustrates a block diagram of a real-time interaction network environment 200, in accordance with some embodiments of the invention. In the illustrated environment, a first user 204 (e.g., acting on his/her own benefit, for the benefit of a first party 204—a first merchant, or the like) is associated with (e.g., a customer of) a first organization 202 (e.g., first financial institution, or the like) and a second user 208 (e.g., acting on his/her own benefit, for the benefit of a second party 209—a second merchant, or the like) is associated (e.g., a customer of) a second organization 206 (e.g., a second financial institution). A resource exchange organization 210 (e.g., a real-time interaction clearing institution, or the like) may facilitate (e.g., hold, service, or the like) a first resource pool 212 (e.g., first account, or the like) associated with the first organization 202 (e.g., first financial institution, or the like) and a second resource pool 214 (e.g., second account, or the like) associated with the second organization 206 (e.g., second financial institution, or the like). The first resource pool 212 and the second resource pool 214 are accessible by each associated organization (e.g., the first organization 202 and the second organization 206, respectively) and the resource exchange organization 210, which acts as a trusted intermediary during settlement between the organizations affiliated with each entity (e.g., each user 204, 208, and/or party 205, 209). Resources (e.g., funds, or the like) may be transferred by each organization (e.g., first organization 202, second organization 206, or the like) to and from the associated resource pools 212, 214 within the resource exchange organization 210 utilizing a clearing system 216. Exchanges between the first resource pool 212 and the second resource pool 214 are administered by the resource exchange organization 210 pending authentication and authorization by participating entities of each resource exchange. It should be understood that since the resource exchange organization 210 maintains resource pools for each organization, the transfer of resources may be made in real-time using the clearing system 216 as described herein (e.g., within 10, 5, or the like seconds). The amount of resources within the resource pools 212, 214 of the organizations 202, 206 may be estimated based on the estimated number of interactions and estimated amounts thereof that each organization 202, 206 typically enters on behalf of its entities (e.g., customers).

It should be further understood that the resource exchange organization 210 may also have a repository system 218 (e.g., database of entities and entity aliases within a single real-time interaction network). The repository system 218 may be utilized for verification and routing of the resources for each of the interactions made through the real-time interaction network. It should be further understood that the resource exchange organization 210 may further have a messaging system 220 that may be utilized to transfer messages between the entities on the real-time interaction network. Moreover, the messages may be used to transfer information other than communication messages between the entities, organizations, the resource exchange organization 210, or the like. The information transferred may include details regarding the interaction (e.g., products—such as goods or services, time, routing of the resources, or the like). As will be discussed in further detail herein, a real-time resource exchange message and/or an electronic document associated therewith may include one or more identifiers (e.g., token, QR Code, barcode, mobile number, e-mail address, or the like) that the resource exchange organization 210 may utilize by looking up the one or more identifiers in the routing directory 216 in order to determine to which resource pool (e.g., second resource pool 214), organization (e.g., second organization), and/or entity (e.g., second entity—second user 208 and/or second party 209) to which the resources should be routed for the interaction. The resource directory 216 (e.g., one or more resource directories) may also be used to determine the processing, error codes, resource exchange treatments, or the like that may be used to process interactions and/or the associated resource exchanges.

In some embodiments, the resource exchange organization 210 may further utilize an interaction datastore (not illustrated), which may store information regarding the interactions and resources for each of the interactions of an organization (e.g., incoming and/or outgoing resource exchanges). Moreover, the resource exchange organization 210 may also utilize interaction reporting (not illustrated) that allows for reporting regarding the interactions of an organization. For example, the interaction reporting may be used to send notifications to the organizations and/or entities related to the interactions that are entered into, in process, and/or completed, and interaction information related thereto.

As an illustrative example, the first user 204 and the second user 208 are participants of a real-time interaction, wherein the first user 204 (e.g., the payor) initiates a credit transfer to the second user 208 (e.g., the payee). The first user 204 may initiate the exchange from the first financial institution 202, wherein the first user 204 provides authentication credentials to authenticate the identity of the first user 204 and to validate that a first user resource pool of the first user 204 held at the first financial institution 202 contains available resources to fulfill the resource exchange. While in some embodiments, the first user 204 may initiate the exchange from a physical, brick-and-mortar location of the first organization 202, in alternative embodiments described herein, the exchange may be initiated from other locations wherein the first user 204 is not required to be at a brick-and-mortar location (e.g., initiated via an electronic application, a website, or the like, such as through a user computer system 110).

The first user 204, as the distributing entity or participant (e.g., payor), may be required to authenticate the user's identity by providing credentials to the associated organization (e.g., first organization 202, resource exchange organization 210, or the like). For example, authentication information may include account numbers, routing numbers, PIN numbers, username and password, date of birth, social security number, or the like, or other authentication information as described herein. In some embodiments, authentication may comprise multi-factor or multi-step authentication in accordance with information security standards and requirements.

As such, as used herein "authentication credentials" is any information that can be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user computer system 110. This authentication information may be used to authenticate the identity of the user (e.g., determine that the authentication information is associated with the account) and determine that the user 102 has authority to access an account or system. The entity or organization may employ additional computer systems, such as authentication servers, to validate and certify resources inputted by the plurality of users within the system.

Returning to the illustrative example, upon initiating an interaction, the first user 204 becomes obligated to exchange the resources for the interaction. As such, in some embodiments, the interaction, and resource exchange thereof, cannot be canceled by the first user 204 following initiation and communication to an intermediary and/or a second user 208 of the interaction. The second user 208, as the receiving entity or participant (e.g., the payee), receives communication to accept the resource exchange, in some embodiments following similar second user 208 authentication, as described with respect to the authentication of the first user 204. Communication between entity (e.g., participants) for the interaction may be transmitted between the organizations 202, 206 via the resource exchange organization 210, which directs the resource exchange to the appropriate organizations 202, 206 associated with the participants (e.g., organizations, entities, or the like). The exchange of resources occurs between the resource pools 212, 214 of the financial institutions 202, 206 on behalf of their respective users 204, 208, wherein the interaction may be settled immediately, concurrent with the resource exchange. As settlement occurs between the representative organizations (e.g., financial institutions, clearing house, or the like), debiting and crediting of individual user resource pools may be managed at each organization with their individual customer and through the organization resource pools at the resource exchange organizations 210. As the interaction is settled immediately, resources may be made available for use in real-time, which may be immediate or near real-time. It should be understood that real-time may be within minutes, seconds, (e.g., within 60, 40, 20, 15, 10, 5, 4, 3, 2, 1, or the like seconds), or the like.

It should be understood that while the illustrated embodiments of FIG. 2 depicts only first and second users 204, 206, organizations 202, 206, and resource pools 212, 214, other embodiments of a real-time interaction network may comprise a plurality of resource pools for a plurality of organizations (e.g., financial institutions), and/or for a plurality of entities. In some embodiments, the real-time interaction environment 200 may further comprise more than one resource exchange organization 210 or at least a plurality of resource exchange organizations (e.g., TCHs, the Federal Reserve, and the like), which cooperate within a resource exchange network to receive and process interaction requests as described herein. It should be understood that the organizations 202, 206 may include one or more community banks, regional banks, credit unions, corporate banks, direct connect financial institutions, or the like. When the organization is a "financial organization", such as a "financial institution", these terms may mean any organization that processes financial transactions (e.g., a transfer of funds or other monetary or financial resources) including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like.

FIG. 3 illustrates a cross-network real-time interaction system environment 300. As illustrated in FIG. 3, one or more cross-network interaction systems 310 may be utilized to facilitate interactions between entities (e.g., users) that are located on different real-time interaction networks (RTIs). It should be understood that the cross-network interaction system 310 may comprise one or more clearing systems 312, one or more repository systems 314, and/or one or more messaging systems 316. It should be further understood that the one or more cross-network interactions systems 310, the one or more clearing systems 312, the one or more repository systems 314, and/or the one or more messaging systems 316 each may comprise one or more processors, one or more communication interfaces, and/or one or more memory devices, as previously described with respect to the systems described in FIG. 1.

As further illustrated in FIG. 3, the cross-network interaction system 310 may be operatively coupled to two or more real-time interaction networks, such as a first real-time interaction network system 330, a second real-time interaction network system 340, a third real-time interaction network system 350, and/or one or more additional Nth real-time interaction network systems 360. Each of these one or more real-time interactions networks 330, 340, 350, 360, may be the same as or similar to the real-time interaction network, and the operation thereof, described with respect to FIGS. 1 and 2. As such, each of the one or more real-time interaction networks 330, 340, 350, 360, operate independently to exchange resources more securely between entities that have been validated, and thus, are located on each individual real-time interaction network. For example, each of these networks have Nth number of users 333, 343, 353, each of which are associated with user computer systems 334, 344, 354. However, each of these real-time interaction networks 330, 340, 350, 360 are limited to exchanging resources between only the users that are located on the respective real-time interaction networks 330, 340, 350, 360. Moreover, while the same user 320 may be located on each of the real-time interaction networks 330, 340, 350, 360, the user 320 is only able to exchange resources with the Nth other users 333, 343, 353, located on the same real-time interaction network 330, 340, 350, 360.

It should be understood that each of the real-time interaction networks 330, 340, 350, 360 described and discussed herein may be located within a single area (e.g., single region, country, province, state, groups of the forgoing, or the like) or may vary across different areas (e.g., different regions, countries, provinces, stats, groups of the forging, or the like). Regardless of whether or not the real-time interaction networks 330, 340, 350, 360 are located in a single area or across areas (however, in particular to real-time interaction networks 330, 340, 350, 360 that are located in different countries), the real-time interaction networks may have different systems, devices, and processes that prevent the real-time interaction networks 330, 340, 350, 360 from allowing interactions between the different networks.

The cross-network interaction system 310 of the present invention provides improvements in that it provides the ability to allow for real-time interactions between entities that belong to different real-time interaction networks 330, 340, 350, 360, which otherwise would not be able to enter into interactions with each other. For example, the cross-network interaction system 310 may have one or more application programing interfaces (APIs) or other systems and applications that can interface with the each of the different real-time interaction networks 330, 340, 350, 360.

In some embodiments the cross-network interaction system 310 may comprise a cross-network clearing system 312. The cross-network clearing system 312 may be similar to the clearing system 216 to the individual real-time interaction network 200 described with respect to FIG. 2. The cross-network clearing system 312 provides systems for holding and managing resource pools (e.g., financial accounts, or the like). The cross-network clearing system 312 may create different cleaning arrangements with the individual real-time interaction networks 200. For example, the cross-network clearing system 312 may hold all of the resources (e.g., funds) of the real-time interaction networks 330, 340, 350, 360 in one or more resources pools of the cross-network interaction system 310. Alternatively, or additionally, the cross-network clearing system 312 may have one or more real resource pools (e.g., accounts that hold funds) for the one or more real-time interaction networks 330, 340, 350, 360. Alternatively, or additionally, the cross-network clearing system 312 may have one or more virtual resource pools for the one or more real-time interaction networks 330, 340, 350, 360. Consequently, the cross-network interaction system 310 may utilize one or more resources pools of its own resources (e.g., to hold funds for exchanging resources between the RTI networks); one or more resource pools of the real-time interaction networks 330, 340, 350, 360 that hold actual funds for each real-time interaction networks; and/or one or more virtual resource pools of the real-time interaction networks 330, 340, 350, 360 that store virtual resources (e.g., virtual funds) for settlement between real-time interaction networks 330, 340, 350, 360.

The cross-network repository system 314 may be utilized by the cross-network interaction system 310 in order to aid in determining where and how to exchange resources between entities across different real-time interaction networks 330, 340, 350, 360. The cross-network repository system 314 may include a database of each entity (e.g., each Nth user 333, 343, 353, or the like) on every one of the real-time interaction networks 330, 340, 350, 360. The cross-network repository system 314 may identify each of the users using an alias (e.g. entity identifier, e-mail, phone number, identification number, or the like) of each of the entities, as well as the corresponding real-time interaction network(s) of each of the users, and/or the number of and corresponding resource pool(s) of the users within each of the real-time interaction networks. For example, the user 320 (e.g., the same user on three different networks) may belong to three of the real-time interaction networks (e.g., a first, second, and third real-time interaction networks). Moreover, the user 320 may have two resource pools (e.g., a first account and a second account) in the first real-time interaction network 330, two resource pools (e.g., a first account and third account) on the second real-time interaction network 340, and a single resource pool (e.g., a fourth account) in the third real-time interaction network 350. In this way the cross-network interaction system 310 may be able to receive resources from and distribute resources to any of the resource pools that the user 320 has on any of the real-time interaction networks 330, 340, 350, as will be discussed in further detail herein with respect to FIG. 4.

In some embodiments the cross-network interaction system 310 does not know the actual identity of the entity. However, in other embodiments of the invention the cross-network interaction system 310, and in particular, the cross-network repository system 314 may include other entity information, such as but not limited to, other resource pools of the entities outside of the real-time interaction networks, financial statements, loan information, financial ratings, and/or other financial and/or business information of the entities. As such, regardless of the information the cross-network interaction system 310 has regarding each entity, the information may be utilized in order to aid in registering (e.g., validating, setting up entity resource pools, or the like) the entity for access to other real-time interaction networks 360 to which the entity does not already belong and/or to aid in providing additional products (e.g., goods or services) to the entity.

The cross-network messaging system 316 may be utilized in order to allow for communication across the real-time interaction network systems 330, 340, 350, 360. The cross-network messaging system 316 may have application program interfaces (APIs) that communicate with different messaging systems of the real-time interaction network systems 330, 340, 350, 360. The messaging systems of the real-time interaction networks systems 330, 340, 350, 360 may be internally operated by the real-time interaction networks, and/or may be provided by the third-party entities acting on behalf of the real-time interaction networks. The cross-network messaging system 316 may be utilized to set up an entity on a new real-time interaction network; search, identify, and communicate with entities on other real-time interaction networks; communicate with entities after interactions have occurred; transfer interaction information regarding the interactions (e.g., purpose of interaction, receipts, images of physical interaction instruments—such as checks, documentation related to the interaction, or the like); provide notifications (e.g., when interactions are requested, are in process, have completed, resource are available, have been transferred, settlement has occurred, or the like); or facilitate other like communications between any entities (e.g., users, third-parties, organizations, or the like).

FIG. 4 illustrates a process flow 400 for setting up a cross-network interaction system 310 and utilizing the system in order to allow for cross-network interactions. As illustrated in block 402 of FIG. 4, the cross-network real-time interaction network is set-up as a central location for managing exchanges between real-time interaction networks. The real-time interaction networks, as described herein, are separate self-contained networks located within an area (e.g., country, or the like) or between different areas (e.g., different countries, or the like). Regardless of where each real-time interaction network is located, each self-contained real-time interaction network may have different systems, applications, processes, or the like that prevents the real-time interaction network from allowing interactions outside of the real-time interaction network. Consequently, setting-up the cross-network real-time interaction system may comprise setting up a communication interface using a messaging system 316, a clearing processes using a clearing system 312, and/or a repository of entities using a repository system 314.

As illustrated by block 404 of FIG. 4, setting up a communication interface may include providing one or more cross-network messaging systems 316 (e.g., communication applications and/or systems) that can communicate with one or more of the real-time interaction networks. The communication applications and/or systems may be specific to communicate with specific real-time interaction networks, such as through the use of APIs that are used to allow communication between the real-time interaction network and the cross-network interaction system 310. The messaging system 316 allows the cross-network interaction network to build out a system of real-time interaction networks to allow entities to search for different real-time interaction networks to which the entities may want to belong (e.g., request registration on different real-time interaction networks), search for other entities on other real-time interaction networks (e.g., search other real-time interaction networks to send or receive resources to or from other entities on other real-time interaction networks), and/or to provide or receive notification from other real-time interaction networks (e.g., when requesting or completing interactions that include the transfer of resources).

Block 406 of FIG. 4 illustrates that a clearing interface is set-up to allow for clearing of interactions with each of the individual real-time interaction networks, such as to transfer resources between the real-time interaction networks and the cross-network clearing system 312 of the cross-network interaction system 310. Like the communication interface, the clearing interface may be created using APIs in order to allow applications and systems that cannot normally communicate to communicate with each other. The clearing system 312 in some embodiments may hold resources pools for each of the real-time interaction networks that belong to the cross-network interaction network. In some embodiments, the resource pools may be actual resource pools (e.g., financial accounts) for which the real-time interaction networks may send and receive resources (e.g., funds) for the interactions across real-time networks. Alternatively, or additionally, the resource pools may be virtual resources pools that are used for settlement purposes (e.g., tracking the resources that each real-time interaction network has) and the actual resources may be held in a centralized resource pool of the cross-network interaction network.

As illustrated by block 408 of FIG. 4, setting up the repository of the entities may comprise having each real-time interface network provide entity information (e.g., should the entities within the real-time interface network opt-into such sharing) to include in the repository system 314 (e.g., database, or the like). As previously discussed herein, the entity information may comprise the entity aliases for each of the real-time interaction networks of the entity, the one or more resource pools each entity has on each real-time interaction network. Moreover, in some embodiments other financial information may be included in the repository. The repository, and in particular the aliases therein, is utilized in order to determine from which distributing entity the resources are being debited from and to which receiving entity the resources are going to be credited. That is, the aliases are validated to one or more real-time interaction networks and/or one or more resource pools therein. As such the aliases are utilized to receive the resources from the distributing real-time interaction network and transfer them to the receiving real-time interaction network. The use of aliases, in some embodiments, prevents the cross-network interaction network from having access to actual resource pool numbers (e.g., account numbers). That is, only the real-time interaction network to which the entity belongs has the resource pools numbers of the entity.

Block 410 of FIG. 4 further illustrates that the cross-network interaction system 310 may receive a request from an entity to become a member of another real-time interaction network to which the entity does not belong. The request may be received directly from the entity (e.g., user 310) through an entity computer system (e.g., user computer system 332) or indirectly through a real-time interaction network on which the entity belongs.

FIG. 4 further illustrates that the cross-network interaction system 310 may aid in registering the entity (e.g., user 320) for membership to the new real-time interaction network. For example, instead of the user 320 directly providing user information to the new real-time interaction network, the cross-network interaction system 310 may provide the user information to the new real-time interaction network. The user information provided by the cross-network interaction system 310 may include verification that the user is validated on one or more other real-time interaction networks, that the user 320 has the required resources (e.g., resource pools, funds therein, or the like), that the user 320 is who the user 320 says he/she is, or the like. Since the cross-network interaction entity (e.g., third-party entity, financial institution, or the like) is a trusted entity that is known by the real-time interaction network, it may reduce the requirements for allowing a new entity (e.g., the user 320) to become a member of the real-time interaction network. For example, a user may be required to typically provide resource pool information (e.g., multiple account numbers, or the like), personal identifying information (e.g., government identification, social security numbers, or the like), past financial information, financial scoring information, or the like, and the information may have to be verified by the real-time interaction network. However, because the cross-network interaction entity is a trusted organization, only a subset of the information may be required, such as resource pool information and verification that the user 310 has been registered on other real-time interaction networks. The user and/or the cross-network interaction organization may provide the information (e.g., all the information or a subset of the information) to the new real-time interaction network on which the user is being registered. Since the cross-network interaction entity is a trusted organization the real-time interaction network needs less verification than would typically be required to register a new entity (e.g., user 320).

FIG. 4 illustrates in block 414 that a request is received from an entity regarding an interaction. The interaction may be a first entity sending resources to a second entity, requesting a second entity to send resources to the first entity (e.g., or send resources to or receive resources from multiple entities). As such, in some embodiments the first entity may be the distributing entity and the second entity may be the receiving entity for the resources, while in other embodiments the first entity is the receiving entity and the second entity is the distributing entity. The request received may be received directly by the cross-network interaction system 310 from the entity (e.g., from the user computer system of the user 320). Alternatively, the request may be received from the entity indirectly from a real-time interaction network system 330, 340, 350, 360 from which the entity is making the request (e.g., from the real-time interaction network that the user 310 is using to make the request). In some embodiments, the request may further include the real-time interaction network 330, 340, 350, 360 through which the entity would like to have the resources sent or received. Furthermore, the if entity has multiple resource pools within a single real-time interaction network, the request my further include the resource pool from which or to which the resources should be exchanged.

The response received from the second entity may include acceptance of the request from the first user, such as acceptance of the resources from the first user, or agreement to send the requested resources to the first user. Moreover, the response from the second user may further include the real-time interaction network to which or from which the user would like to exchange the resources. Additionally, should the second user have more than one resource pool on the selected real-time interaction network, the response may further include the resource pool from which or to which the resources should be removed from and/or added thereto.

Block 416 of FIG. 4 further illustrates that the cross-network interaction system 310 receives the resources from the distributing entity from the distributing real-time interaction network. For example, the distributing real-time interaction network may have one or more resource pools held in a distributing real-time interaction network resource pool. The distributing resource pool may be an actual resource pool in which actual resources of the distributing real-time interaction network are held. In this way, in some embodiments, when the resources are removed from the distributing resource pool they are transferred directly to a general resource pool of the cross-network interaction organization or directly to a receiving resource pool of the receiving real-time interaction network, as will be discussed with respect to block 418. Alternatively, the distributing resource pool may be a virtual resource pool that only holds virtual resources of the distributing real-time interaction network for settlement purposes as will be discussed in further detail with respect to block 420. As such, only virtual resources stored in the virtual distributing resource pool of the distributing real-time interaction network may be removed from the virtual distributing resource pool.

Block 418 of FIG. 4 illustrates that the cross-network real-time interaction system 310 transfers the resources to the receiving entity through the use of the receiving real-time interaction network. For example, the receiving real-time interaction network may have one or more resource pools held in a receiving real-time interaction network resource pool. The receiving resource pool may be an actual resource pool in which actual resources of the receiving real-time interaction network are held. In this way, in some embodiments, when the resources are added to the receiving resource pool they are transferred from a general resource pool of the cross-network interaction organization or directly from a distributing resources pool of the distributing real-time interaction network. Alternatively, the receiving resource pool may be a virtual resource pool that only holds virtual resources of the receiving real-time interaction network for settlement purposes as will be discuss in further detail with respect to block 420. As such, only virtual resources are received in the virtual receiving resource pool of the receiving real-time interaction network from the virtual distributing resource pool.

FIG. 4 further illustrates in block 420 that settlement occurs once the resources are transferred to the appropriate resource pool, such as either the actual resource pool or the virtual resource pool of the real-time interaction networks. The settlement of the interactions accounts for the transfer of the resources within the cross-network interaction system 310 for record keeping.

With respect to when the real-time interaction networks utilize actual resources pools within the cross-network interaction system 310, each of the real-time interaction networks may add to, or remove from, the actual resource pools of each of the real-time interaction networks depending on the individual needs of each of the real-time interaction networks (e.g., estimated resources needed in the cross-network interaction system to satisfy cross-network interaction requirements).

With respect to when the real-time interaction networks utilize virtual resource pools within the cross-network interaction system 310, the cross-network interaction system 310 may have one or more resource pools that hold all of the resources for the combinations of the real-time interaction networks. The virtual resource pools of the real-time interaction networks are utilized for tracking the resources each of the real-time interaction networks have within the cross-network interaction systems 310. Consequently, when each real-time interaction network adds resources to the network or removes resources from the cross-network interaction systems 310, the resources are stored within the one or more central resource pools of the cross-network interaction systems 310 and accounted for in the virtual resource pools of the respective real-time interaction networks.

In some embodiments of the invention each interaction, the interaction information for each interaction, the exchange of resources, and/or the entities and entity information stored by the cross-network interaction may be stored in a distributed register. A distributed register is a distributed database that maintains a list of data records, the security of which is enhanced by the distributed nature of the register. The distributed register may also be described as a distributed ledger or distributed block chain. As described herein, a distributed register typically includes several nodes, which may be one or more entities (e.g., individual users, organizations or the like), systems of an entity (e.g., machines, computers, databases, data stores or the like) operably connected with one another. For example, the various systems described with respect to FIG. 3, or systems within the systems described with respect to FIG. 3 may be the nodes. In some aspects of the invention, an entity system may be a node of a block chain, and internal or external users 4 may access the entity systems in order to take actions with respect to the resources. In other aspects of the invention, each of the nodes or multiple nodes are maintained by different entities, or components within an entity, and as such different systems within an entity or between entities may act as nodes. A distributed register typically works without a central repository or single administrator, however, a network of nodes within a single entity or group of entities may together serve as a central repository or single administrator that can control access to the distributed register that is associated with a plurality of different nodes. One application of a distributed register is a public register for transactions for cryptocurrencies. In this use of a distributed register, the data records recorded in the distributed register are enforced cryptographically and stored on the nodes of the distributed register.

A distributed register provides numerous advantages over traditional databases. For example, with respect to utilizing a distributed register for interactions and/or resource tracking, a large number of nodes of a distributed register block may reach a consensus regarding the validity of an interaction and/or resource exchange contained on a decentralized register. Similarly, when multiple versions of interaction information and/or entity information exist on the register, multiple nodes can converge on the most up-to-date version of the interaction information and/or entity information. For example, any node within the distributed register that stores or validates the information, can determine within a level of certainty whether the information is correct and the information becomes final by confirming that no conflicting information (e.g., the interaction, entity information, or the like) is confirmed by the distributed register elsewhere on other nodes.

The distributed register typically has two primary types of records. The first type is the information type (e.g., interaction information, resource information, entity information, alias information, or the like), which consists of the actual data stored in the distributed register. The second type is the register type, which are records that confirm when and in what sequence certain information (e.g., resource information, or the like) became recorded as part of the distributed register. Information is created by entities using the distributed register in its normal course of business, for example, when someone records an interaction, entity information, real-time network information, or the like register entries may be created by users known as "miners" who use specialized software/equipment to create the register entries for the event. Users of the distributed register create blocks for the information (e.g., interaction information, resource information, entity information, real-time network information, or the like), which is passed around to various nodes of the distributed register. Valid information is one that can be validated based on a set of rules that are defined by the particular system implementing the distributed register. For example, in the case of cryptocurrencies, a valid transaction is one that is digitally signed, spent from a valid digital wallet and, in some cases, meets other criteria. In the present disclosure, valid information may also be one that is digitally signed, sent from a valid node, may be verified by multiple entities, or the like. In some distributed register systems, miners receive benefits to create register entries by a reward structure that offers a pre-defined per-register entry reward and/or payments offered within the validated entries (e.g., for individual interactions). Thus, when a miner successfully validates an interaction on the distributed register, the miner may receive rewards and/or payments as a benefit to continue creating new register entries. In the present disclosure the payments may be made when the resources (e.g., funds) are transferred between entities in the cross-network interactions (e.g., transaction).

As mentioned above, the distributed register is typically decentralized—meaning that a distributed register component (e.g., a decentralized register) is maintained on multiple nodes of the distributed network of nodes. One node in the distributed register may have a complete or partial copy of the entire register or set of information (e.g., interaction information, resource information, entity information, real-time interaction information, or the like). Information may be initiated at a node of a distributed register and communicated to the various other nodes of the distributed network of nodes. Any of the nodes, or users of the nodes, which have access to the distributed register to validate the information, add the information to its copy of the distributed register, and/or provide the information (e.g., interaction information, resource information, entity information, real-time interaction network information, or the like) and/or other data to other nodes. This other data may include timestamping, such as is used in cryptocurrency distributed registers.

In various aspects, the distributed register may be configured with a set of rules (otherwise described herein as "limits") to dictate what actions may be taken by an entity (e.g., users, organizations, or the like) and/or nodes various information, how information may be accessed, created, stored, disseminated, and/or validated, and/or how the network communicates information throughout the one or more distributed registers across the nodes. In some aspects of the disclosure, the rules dictate that an originating node (i.e., a node through which an interaction or information submission was initiated) must approve all actions for resource information mapped to that node. In some aspects of the disclosure, the rules dictate that some or all actions for resource information may be approved by one or more validator nodes without further input from the originating node. In some such cases, the rules dictate that additional information is needed in determining whether an action for resources should be approved. In other aspects, the validating node must reach out to the originating node in certain situations as dictated by the rules. For example, if the action for the resource, such as validating a transfer of a vehicle, is in any way indicated to be a faulty or invalid (due to some information present on the distributed register), then the rules may dictate that the validating node communicate with the originating node to confirm or deny validation of the resource event.

In some aspects of the disclosure, the validator may approve the resource event (e.g., resource information, or the like) without communicating with the originating node. In such a case, the validator (or a group or all of validators if multiple or universal validations, respectively, are required by the rules), can approve the action for the resource based solely on the information contained in the distributed register. Thus, if an action for a resource is requested and a validator receives the action for the resource, it can check the actions for the resource against its register to determine whether an originating node has validated the resource event. If so, then the validator may approve the action for the resource. In this regard, the action for the resource may be approved very quickly, and in some cases, in real-time or near real-time.

In various aspects, any of the nodes, may be a validator or a miner that validates resource information. In some aspects of the disclosure, a number of the nodes must validate resource information in order for the resource information to be approved. For example, in one embodiment, two or three nodes must validate the authenticity of resource information, or portions thereof, before the resource information may be approved. As noted above, in some instances, the rules of the distributed register and/or rules specific to particular originating nodes or validator nodes dictate that validator nodes cannot approve actions without confirming available information (e.g., funds used in an interaction, or the like). In some cases, the available information is already associated with another entity on the distributed register, but in other cases, the validator node on the distributed register must communicate with the originating nodes in order to request approval for the resource information.

In some aspects of the disclosure, the rules may only be changed by the originating node (maintained by an originating entity or entities that control the distributed register) to ensure the validity of a change to a rule. In some cases, particularly in cases where one or more nodes have raised a concern that information is not valid, the originating node may be contacted for verification of the resource information.

In various aspects, resource information is stored and executed from one or more systems and is not placed on the public distributed register itself, and instead is located on a private portion of the distributed register (e.g., account information related to the transfer of funds). In some aspects of the disclosure, the information for the event, is only stored and executed from a subset of the nodes of the distributed register, which, in some aspects, are synonymous with validator nodes and in other aspects are not synonymous with the validator nodes. In some aspects, placeholder(s) for the information, or the like, indicating that the resource information exists and is accessible within a private distributed register may be placed on the public distributed register (e.g., an indication that funds were transferred, but not the amount of the funds). In some cases, the information may be executed only by the designated one or more nodes (e.g., on the private distributed register, or on a private portion of a distributed register). Such systems may utilize a key or other security mechanism(s) in order to ensure only certain nodes are allowed access to the information related to the private distributed register portion. In some cases, this configuration may result in additional security instead of placing the event on the public distributed register for any node to execute.

The present invention provides improvements over the traditional processing channels (e.g., wiring funds, or the like) between different areas (e.g., across different countries, or the like) which often takes days or weeks to complete and also requires high transaction costs (e.g., 5, 10, 20, 30, or the like percent of the transaction amount). Instead the cross-network integration system allows for cross-network interactions (e.g., cross-boarder transactions) using the real-time interaction networks that previously could not interact with each other. Furthermore, the present disclosure provides a repository of the entities across the various real-time interaction networks, and the associated aliases of the entities, to allow the entities to search for other entities on other real-time interaction networks to which the searching entity does not belong. Moreover, the present invention allows for cross-network interactions without requiring an entity to belong to and/or share resource pool information (e.g., account information, such as bank account numbers, or the like) with each of the real-time interaction network. As such, the present invention also improves security by limiting the real-time interaction network and/or other entities that have access to the account information of each entity.

In some embodiments, the systems described herein may comprise a plurality of subsystems having a plurality of subsystem formats, wherein the system may transmit the update to the plurality of subsystems based on a subsystem format associated with each of the individual subsystems. For example, a system may comprise subsystems having a mixture of real-time interaction formats and batch processing formats. The system is configured to transmit the update to each of the subsystems individually depending on an associated subsystem format of each subsystem.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with real-time payment clearing and settlement.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for real-time payment clearing and settlement, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A cross-network interaction system for exchanging resources between real-time interaction networks, the system comprising:
    one or more memory devices storing computer-readable code; and
    one or more processing devices operatively coupled to the one or more memory devices, wherein the one or more processing devices are configured to execute computer-readable program code to:
        receive interaction information from an entity regarding an interaction, wherein the interaction comprises an exchange of resources from a distributing entity to a receiving entity for the interaction, wherein the entity is the receiving entity or the distributing entity, and wherein the distributing entity belongs to a first real-time interaction network and the receiving entity belongs to a second real-time interaction network;
        transfer resources from a first resource pool of the first real-time interaction network to a second resource pool of the second real-time interaction network;
        settle the interaction between the first real-time interaction network and the second real-time interaction network, and wherein the resources are exchanged and the interaction is settled using a receiving entity alias of the receiving entity and a distributing entity alias of the distributing entity;
        receive a request from the entity to become a member of an additional real-time interaction network;
        identify one or more real-time interaction networks from a plurality of real-time interaction networks to which the entity belongs;
        provide entity information of the entity from the one or more real-time interaction networks to the additional real-time interaction network for which the entity wants to belong for verification of the entity; and
        receive a notification from the additional real-time interaction network that the entity has been added to the additional real-time interaction network.

2. The system of claim 1, wherein the receiving entity selects the second real-time interaction network to receive the resources from the plurality of real-time interaction networks for which the receiving entity belongs.

3. The system of claim 1, wherein the distributing entity selects the first real-time interaction network from which to send the resources from the plurality of real-time interaction networks for which the distributing entity belongs.

4. The system of claim 1, wherein the first real-time interaction network is in a first country and wherein the second real-time interaction network is in a second country.

5. The system of claim 1, wherein the first real-time interaction network has a first repository system, a first clearing system, and a first messaging system, and wherein the second real-time interaction network has a second repository system, a second clearing system, and a second messaging system, and wherein the system has one or more application processing interfaces (APIs) to communicate with the first repository system, the first clearing system, the first messaging system, the second repository system, the second clearing system, and the second messaging system.

6. The system of claim 1, further comprising one or more cross-network clearing systems to hold the resources for the plurality of real-time interaction networks.

7. The system of claim 6, wherein the first resource pool holds first resources for the first real-time interaction network and the second resource pool holds second resources for the second real-time interaction network within the one or more cross-network clearing systems, and wherein the system facilitates the exchange of the resources between the first resource pool and the second resource pool.

8. The system of claim 6, wherein the first resource pool is a first virtual resource pool and the second resource pool is a second virtual resource pool, and the resources are held within a clearing resource pool within the one or more cross-network clearing systems.

9. The system of claim 1, further comprising a cross-network repository system for storing a plurality of entities, the plurality of real-time interaction networks on which the plurality of entities are members, and a plurality of aliases for the plurality of entities.

10. The system of claim 9, wherein the entity of the plurality of entities utilizes different aliases for at least two of the plurality of real-time interaction networks on which the entity belongs.

11. The system of claim 9, wherein the entity on a real-time interaction network searches the cross-network repository system to identify an opposing entity on a different real-time interaction network.

12. The system of claim 1, further comprising a cross-network messaging system for allowing messages for interactions between the plurality of real-time interaction networks.

13. The system of claim 1, wherein the entity information comprises one or more aliases of the entity for the one or more real-time interaction networks to which the entity belongs.

14. A computer-implemented method for exchanging resources between real-time interaction networks using a cross-network interaction system, the computer-implemented method comprising:
    receiving, by one or more processors, interaction information from an entity regarding an interaction, wherein the interaction comprises an exchange of resources from a distributing entity to a receiving entity for the interaction, wherein the entity is the receiving entity or the distributing entity, and wherein the distributing entity belongs to a first real-time interaction network and the receiving entity belongs to a second real-time interaction network;
    transferring, by the one or more processors, the resources from a first resource pool of the first real-time interaction network to a second resource pool of the second real-time interaction network;

settling, by the one or more processors, the interaction between the first real-time interaction network and the second real-time interaction network; wherein the resources are exchanged and the interaction is settled using a receiving entity alias of the receiving entity and a distributing entity alias of the distributing entity;

receiving, by the one or more processors, a request from the entity to become a member of an additional real-time interaction network;

identifying, by the one or more processors, one or more real-time interaction networks from a plurality of real-time interaction networks to which the entity belongs;

providing, by the one or more processors, entity information of the entity from the one or more real-time interaction networks to the additional real-time interaction network for which the entity wants to belong for verification of the entity; and receiving, by the one or more processors, a notification from the additional real-time interaction network that the entity has been added to the additional real-time interaction network.

15. The method of claim 14, wherein the first real-time interaction network has a first repository system, a first clearing system, and a first messaging system, and wherein the second real-time interaction network has a second repository system, a second clearing system, and a second messaging system, and wherein the cross-network interaction system has one or more application processing interfaces (APIs) to communicate with the first repository system, the first clearing system, the first messaging system, the second repository system, the second clearing system, and the second messaging system.

16. The method of claim 14, wherein the cross-network interaction system further comprises one or more cross-network clearing systems to hold the resources for the plurality of real-time interaction networks.

17. The method of claim 14, wherein the cross-network interaction system further comprises a cross-network repository system for storing a plurality of entities, the plurality of real-time interaction networks on which the plurality of entities are members, and a plurality of aliases for the plurality of entities.

18. The method of claim 14, wherein the cross-network interaction network further comprises a cross-network messaging system for allowing messages for interactions between the plurality of real-time interaction networks.

19. A computer program product for exchanging resources between real-time interaction networks, the computer program product comprising at least one non-transitory computer-readable medium having computer-readable program code portions embodied therein, the computer-readable program code portions comprising:

an executable portion configured to receive interaction information from an entity regarding an interaction, wherein the interaction comprises an exchange of resources from a distributing entity to a receiving entity for the interaction, wherein the entity is the receiving entity or the distributing entity, and wherein the distributing entity belongs to a first real-time interaction network and the receiving entity belongs to a second real-time interaction network;

an executable portion configured to transfer the resources from a first resource pool of the first real-time interaction network to a second resource pool of the second real-time interaction network;

an executable portion configured to settle the interaction between the first real-time interaction network and the second real-time interaction network, wherein the resources are exchanged and the interaction is settled using a receiving entity alias of the receiving entity and a distributing entity alias of the distributing entity an executable portion configured to receive a request from the entity to become a member of an additional real-time interaction network;

an executable portion configured to identify one or more real-time interaction networks from the plurality of real-time interaction networks to which the entity belongs;

an executable portion configured to provide entity information of the entity from the one or more real-time interaction networks to the additional real-time interaction network for which the entity wants to belong for verification of the entity; and an executable portion configured to receive a notification from the additional real-time interaction network that the entity has been added to the additional real-time interaction network.

\* \* \* \* \*